US011802613B1

(12) United States Patent
Love

(10) Patent No.: US 11,802,613 B1
(45) Date of Patent: Oct. 31, 2023

(54) LOCKING DIFFERENTIAL ENERGY MANAGEMENT FOR WORK VEHICLES

(71) Applicant: Deere & Company, Moline, IL (US)

(72) Inventor: Galen R. Love, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/845,013

(22) Filed: Jun. 21, 2022

(51) Int. Cl.
  F16H 48/22     (2006.01)
  F16H 57/04     (2010.01)
  F16H 57/01     (2012.01)
  F16H 48/32     (2012.01)
  F16H 48/20     (2012.01)

(52) U.S. Cl.
  CPC ......... F16H 48/22 (2013.01); F16H 57/0473 (2013.01); B60K 2370/178 (2019.05); F16H 48/32 (2013.01); F16H 2048/204 (2013.01); F16H 2057/014 (2013.01)

(58) Field of Classification Search
  CPC ....... F16H 48/22; F16H 2048/204–208; F16H 2057/014–016; F16H 57/0473; F16H 48/27; F16H 48/32; B60K 2023/046
  See application file for complete search history.

(56) References Cited

U.S. PATENT DOCUMENTS 6,464,056 B1 * 10/2002 Lowell ..................... F16H 48/34
                                                  475/88
6,752,742 B2 * 6/2004 Shigeta .............. B60K 23/0808
                                                  701/69
6,789,657 B2 * 9/2004 Schrand .................. F16H 48/30
                                                  192/85.02
6,905,180 B2   6/2005 Mayer et al.
6,942,055 B2 * 9/2005 Forsyth .................. B60K 17/34
                                                  475/86

(Continued)

FOREIGN PATENT DOCUMENTS

CN    105564468 B      5/2016
CN    105987167 A * 10/2016  ............... B60K 1/00

(Continued)

*Primary Examiner* — Ernesto A Suarez
*Assistant Examiner* — James J Taylor, II
(74) *Attorney, Agent, or Firm* — KLINTWORTH & ROZENBLAT IP LLP

(57) ABSTRACT

A work vehicle locking differential energy management system includes axle speed sensors for monitoring the rotational speeds of axle half-shafts. The axle half-shafts are coupled through a locking differential, which contains a differential clutch mechanism. A processing subsystem is configured to: (i) when the locking differential is placed in a locked state, calculate a differential lock force applied to the clutch mechanism, and calculate a differential slip speed from a disparity in the rotational speeds of the axle half-shafts; (ii) estimate an internal temperature of the clutch mechanism based, at least in part, on the differential lock force and the differential slip speed; (iii) detect differential overtemperature events during which the internal temperature of the clutch mechanism exceeds a first critical temperature threshold; and (iv) perform at least one differential overtemperature action in response to detection of a differential overtemperature event.

19 Claims, 6 Drawing Sheets

(56) References Cited

U.S. PATENT DOCUMENTS

| | | | | |
|---|---|---|---|---|
| 8,740,741 | B2 * | 6/2014 | Wood, Jr. | F16H 48/22 |
| | | | | 475/160 |
| 9,102,334 | B2 * | 8/2015 | Anderson | B60W 50/0097 |
| 10,018,171 | B1 * | 7/2018 | Breiner | F02N 11/0818 |
| 2021/0086557 | A1 | 3/2021 | Love et al. | |

FOREIGN PATENT DOCUMENTS

| | | | | |
|---|---|---|---|---|
| CN | 111853226 A | | 10/2020 | |
| DE | 10350936 A1 * | | 5/2004 | F16H 61/12 |
| DE | 102009032265 A1 * | | 1/2011 | B60K 23/0808 |

* cited by examiner

LOCKING DIFFERENTIAL ENERGY MANAGEMENT FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to energy management systems for locking differentials onboard work vehicles.

BACKGROUND OF THE DISCLOSURE

A primary metric impacting work vehicle efficiency, from both temporal and cost standpoints, is work vehicle uptime. Work vehicle uptime increases as work vehicle maintenance needs are lessened, whether through the development of increasingly robust system components or through improved operator guidance in piloting work vehicles to avoid accelerated component wear. This is particularly true in the context of critical work vehicle systems, such as hydraulic brake and powertrain systems, onboard high payload work vehicles. Extensive engineering efforts and the development of enhanced operator interfaces have improved work vehicle durability and capabilities over time, while further reducing system maintenance needs. Nonetheless, industry demands continue to seek further advancements in managing work vehicle maintenance demands, while facilitating optimal operation of critical work vehicle systems for further gains in work vehicle uptime. So too are innovations increasingly sought introducing additional intelligence into the strategic automation of work vehicle functions and supporting semi-autonomous or fully autonomous work vehicle operation.

SUMMARY OF THE DISCLOSURE

Locking differential energy management systems for deployment onboard work vehicles are disclosed. In embodiments, the locking differential energy management system includes axle speed sensors configured to monitor the rotational speeds of axle half-shafts of a work vehicle, a locking differential through which the axle half-shafts are mechanically coupled, a computer-readable memory, and a processing subsystem. The processing subsystem is configured to: (i) when the locking differential is placed in a locked state utilizing a differential clutch mechanism within the locking differential, calculate a differential lock force applied to the differential clutch mechanism and a differential slip speed from a disparity in the rotational speeds of the axle half-shafts; (ii) estimate an internal temperature of the differential clutch mechanism based, at least in part, on the differential lock force and the differential slip speed; (iii) detect differential overtemperature events during which the estimated internal temperature of the differential clutch mechanism exceeds at least a first critical temperature threshold stored in the computer-readable memory; and (iv) perform at least one predetermined differential overtemperature action in response to detection of a differential overtemperature event.

In at least some instances in which the locking differential is hydraulically actuated, the locking differential energy management system further includes a hydraulic pressure sensor configured to monitor a hydraulic actuation pressure supplied to the locking differential. In such instances, the processing subsystem may be configured to determine the differential lock force as a function of the hydraulic actuation pressure supplied to the differential clutch mechanism.

In other instances in which the locking differential energy management system further includes a temperature sensor for monitoring a temperature of a coolant circulated through the differential clutch mechanism, the processing subsystem may be configured to estimate the internal differential clutch temperature further based on the temperature of the coolant circulated through the differential clutch mechanism and, perhaps, further based on a flow rate of the coolant circulated through the differential clutch mechanism.

In embodiments in which the locking differential energy management system also includes a hydraulic pump for circulating coolant through the differential clutch mechanism, the processing subsystem may be further configured to increase an output of the hydraulic pump to temporarily boost coolant flow through the differential clutch mechanism when detecting a differential overtemperature event.

In implementations in which the energy management system includes a display device otherwise associated with (e.g., located onboard) the work vehicle, the processing subsystem may be configured to generate a visual notification of the differential overtemperature event on the display device when appropriate. Specifically, in various implementations, the processing subsystem may be configured to: (i) when detecting a differential overtemperature event, determine whether the internal differential clutch temperature further exceeds a second critical temperature threshold stored in the computer-readable memory, the second critical temperature threshold greater than the first critical temperature threshold; (ii) if determining that the internal differential clutch temperature exceeds the first critical temperature threshold and is less than the second critical temperature threshold, generate a low level notification of the differential overtemperature event on the display device; and (iii) if determining that the internal differential clutch temperature exceeds the second critical temperature threshold, generate a high level notification of the differential overtemperature event on the display device.

In further embodiments, the processing subsystem may be configured to utilize a wireless network interface to transmit data indicative a differential overtemperature event to a remote operations center over a communications network. Additionally or alternatively, the processing subsystem may be configured to record data describing the differential overtemperature event into the computer-readable memory in response to detection of a differential overtemperature event.

In still further instances, the processing subsystem may be configured to increase, to partially reduce, or to temporarily cease application of the differential lock force applied to the differential clutch mechanism in response to detection of a differential overtemperature event. In such instances, the processing subsystem may be further configured to: (i) when detecting a differential overtemperature event, determine a severity of the differential overtemperature event; and (ii) reduce the differential lock force in relation to (e.g., in proportion to) the determined severity of the differential overtemperature event. Additionally or alternatively, the processing subsystem may be configured to: (i) after partially reducing or removing the differential lock force, monitor whether the internal differential clutch temperature decreases below the first critical temperature threshold by a predetermined amount while the locking differential is still desirably locked; and (ii) restore the differential lock force to a maximum value if the internal differential clutch temperature decreases below the first critical temperature threshold by the predetermined amount while the locking differential is still desirably locked.

Embodiments of a method carried-out by a processing subsystem included in a locking differential energy management system are further disclosed. The processing subsystem may be located onboard a work vehicle having (e.g., two coaxial) axle half-shafts mechanically coupled through a locking differential, which contains a differential clutch mechanism controllable to selectively place the locking differential in a locked state. Embodiments of the method include the steps or processes of: (i) when the locking differential is placed in a locked state, calculating a differential lock force applied to the differential clutch mechanism and a differential slip speed from a disparity in rotational speeds of the axle half-shafts, as detected by axle speed sensors onboard the work vehicle and coupled to the processing subsystem; (ii) estimating an internal temperature of the differential clutch mechanism based, at least in part, on the differential lock force and the differential slip speed; (iii) detecting differential overtemperature events during which the internal temperature of the differential clutch mechanism exceeds at least a first critical temperature threshold stored in a computer-readable memory accessible to the processing subsystem; and (iv) performing at least one predetermined differential overtemperature action in response to detection of a differential overtemperature event.

Embodiments of the method may further include or entail the step of determining the differential lock force as a function of the hydraulic actuation pressure supplied to the differential clutch mechanism, as detected by a hydraulic pressure sensor onboard the work vehicle and coupled to the processing subsystem.

Other implementations of the above-mentioned method may include the step of estimating the internal differential clutch temperature further based on at least one of: (i) the temperature of the coolant circulated through the differential clutch mechanism, as measured by a temperature sensor onboard the work vehicle; and (ii) a flow rate of the coolant circulated through the differential clutch mechanism.

Further embodiments of the method may include the step or process of boosting coolant flow through the differential clutch mechanism in response to detection of a differential overtemperature event by, for example, increasing an output of a hydraulic pump onboard the work vehicle and utilized to drive coolant circulation through the differential clutch mechanism.

In still other implementations, one or more of the following steps may be further performed via processing subsystem and in response to detection of a differential overtemperature event: (i) generating a notification of the differential overtemperature event on a display device located onboard or otherwise associated with the work vehicle; (ii) transmitting data indicative the differential overtemperature event to a remote operations center over a communications network; (iii) recording data describing the differential overtemperature event into the computer-readable memory; and (iv) controlling actuation of the locking differential to increase, to partially reduce, or to temporarily cease application of the differential lock force applied to the differential clutch mechanism.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
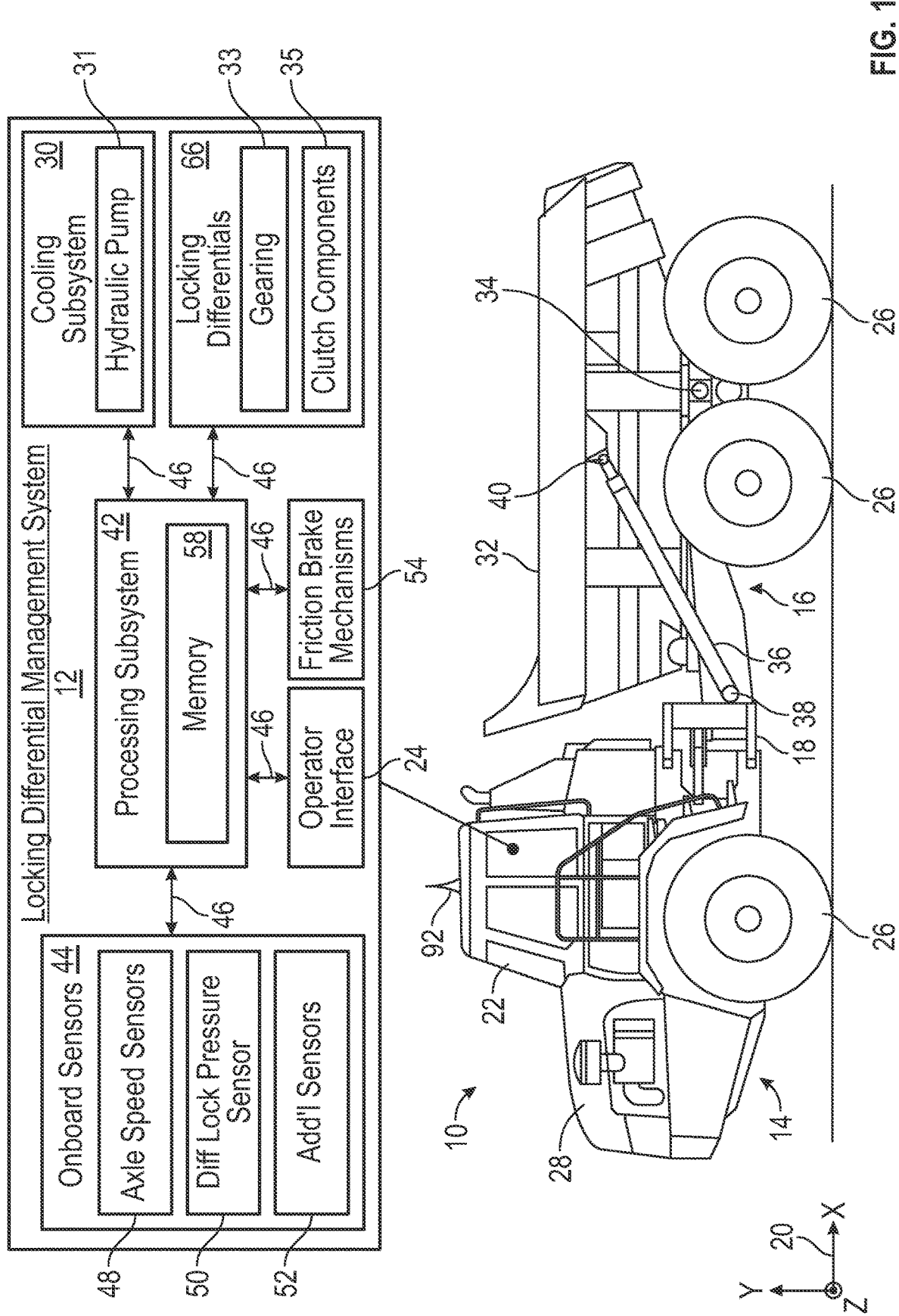
FIG. 1 is a side view of a work vehicle (here, an articulated dump truck) equipped with a locking differential energy management system (schematically shown), as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set forth in the appended claims. As appearing herein, the terms "lubricant" and "coolant" may be utilized interchangeably when a liquid lubricant also provides cooling when circulated through a locking differential.

Overview

Work vehicle uptime is directly impacted by the maintenance needs of critical work vehicle systems, such as locking differential systems integrated into work vehicles utilized within agricultural, construction, mining, and forestry industries. Locking differentials may be deployed onboard work vehicles requiring high traction offroad performance and are often electronically or hydraulically controlled. In the case of hydraulically-controlled locking differentials, for example, a given differential may include a housing or casing, a differential clutch pack, and a gearing arrangement. The differential gearing arrangement couples a mechanical input of the locking differential to two axle half-shafts, which are positioned on either side of the differential in a coaxial relationship. The differential clutch pack may contain a hydraulic piston, which can be controlled to selectively press the differential clutch components into frictional engagement and transition the differential to a locked state. Specifically, when extended in the presence of an elevated hydraulic actuation pressure, the hydraulic piston may exert a relatively high clamp force across the differential clutch components to lock the differential by forcing the clutch components into frictional engagement. This equalizes rotational rates of the axle half-shafts and the wheels mounted to the shaft ends, providing little to no slippage occurs between the clutch components. When the differential actuation or locking pressure is subsequently relieved, the piston within the differential clutch mechanism retracts (e.g., under the influence of a retractor spring), and the differential clutch components return to a tightly spaced, non-contacting or minimally-contacting position. This returns the locking differential to an unlocked state, which permits the axle half-shafts and the associated wheels to rotate at independent rates once again.

Proper locking differential maintenance is of fundamental importance given the heavily-loaded conditions under which many work vehicles operate, the relatively high tonnage and payload-carrying capacity of many work vehicles, and other factors. Concurrently, it is desirable to reduce the frequency with which locking differentials require maintenance to minimize monetary costs directly associated with part replacement and service expenses, as well as indirect costs attributable to increased work vehicle downtime. The manner in which a work vehicle locking differential is controlled, whether by a human operator or through an automated control scheme, directly impacts the lifespan and service requirements of the differential clutch components. When excess energy is dissipated through a differential clutch mechanism due to slippage and despite the application of a relatively high clamping force, such excess energy is rapidly converted to waste heat by frictional forces within the differential clutch mechanism. Depending upon the duration of such high energy slippage events, as well as the overall heat rejection capabilities of the active liquid cooling system utilized to remove heat from the differential clutch mechanisms, undesirably elevated temperatures may occur within the differential clutch mechanisms exacerbating component wear; and, in severe cases, reducing the effectiveness of the locking differential in equalizing half-shaft rotation when subsequently locked.

The development of highly elevated local temperatures within differential clutch mechanisms (herein, "differential overtemperature events") often occurs in a highly abrupt manner, particularly when relatively large quantities of energy are dissipated through differential clutch mechanisms in an abbreviated period of time. In many instances, an operator of the work vehicle remains unaware of the occurrence, severity, and impact of the differential overtemperature events on the differential locking efficacy and overall differential component health. Despite this, relatively few, if any conventional locking differential systems effectively monitor differential overtemperature events, record meaningful health data related to such events, or otherwise seek to implement strategic actions in response to the occurrence of differential overtemperature events. One reason for this may stem from technical challenges encountered when attempting to directly measure highly elevated internal temperatures occurring locally within a differential clutch mechanism, as well as the highly transitory or dynamic nature of such thermal variances. An ongoing demand consequently exists for locking differential energy management systems providing optimized energy management of work vehicle locking differentials through improved monitoring of differential overtemperature events and the performance of certain responsive actions.

In satisfaction of the above-described industrial demand, unique locking differential energy management systems for deployment onboard work vehicles are disclosed. Through certain management, prognostic, and protective functions of the locking differential energy management systems, various benefits are realized including, but not limited to, encouraging proper machine operation by human operators to improve axle and locking differential reliability; boosting work vehicle uptime through increasingly intelligent, prognostic guidance of vehicle maintenance needs; and/or optimizing the timing of automated differential locking functions. Similarly, processes usefully carried-out by locking differential energy management systems are disclosed, which may be leveraged in the context of fully or semi-autonomous work vehicles to refine automated locking differential control schemes and to further boost work vehicle uptime, productivity, and durability. For example, in this latter regard, embodiments of the present disclosure provide unique control schemes for selectively transitioning locking differentials onboard work vehicles between fully locked, partially locked, and unlocked states based on estimated internal temperatures within the differential clutch mechanisms and other factors.

During operation, embodiments of the locking differential energy management system repeatedly estimate temperatures within differential clutch mechanisms onboard a work vehicle utilizing stored data and sensor inputs. Such sensor inputs include data received from axle speed sensors, which monitor the respective rotational speeds of coaxial half-shafts of a work vehicle axle. Additionally, such sensor inputs may include hydraulic sensor input indicative of a hydraulic actuation pressure supplied to a locking differential when, for example, the locking differential is hydraulically actuated. Still other data inputs or parameters usefully considered in carrying-out at least some embodiments of the presently-disclosed methods or algorithms may include coolant (e.g., oil) supply or exit temperatures upstream or downstream, respectively, of the differential clutch mechanisms; coolant flow rates (e.g., as directly measured or calculated utilizing pump shaft speed and displacement values); and/or similar parameters impacting the heat dissipation properties of the liquid cooling system with respect to the locking differentials at a given juncture in time. Such data inputs may be provided to a processing subsystem, which consumes such data inputs in carrying-out specialized algorithms for estimating internal temperatures of the differential clutch mechanism or mechanisms under consideration. By tracking such differential clutch temperature estimates, the processing subsystem monitors for differential overtemperature events by determining whether the current internal differential clutch temperatures exceed one or more critical predetermined temperature thresholds. When detecting a differential overtemperature event, the processing subsystem may perform certain actions or measures (herein, "differential overtemperature actions") to realize the desired energy management, prognostic, and/or protective functions of the locking differential energy management system.

The particular manner in which the processing subsystem of the locking differential energy management system estimates or tracks the internal temperatures of the locking differentials will differ between embodiments of the present disclosure. In one approach, the processing subsystem may consume, as inputs, the slip speed of one or more locking differentials (e.g., as calculated utilizing the difference in rotational speed between the axle half-shafts coupled through the differential) and a differential lock force (e.g., hydraulic actuation pressure) supplied to the differential clutch mechanism(s) within the locking differential or differentials. Additionally, the processing subsystem may also consider the energy withdrawn from the differential clutch mechanism by active liquid cooling when estimating the internal temperatures of the differential clutch mechanisms; e.g., as inferred from data inputs indicative of the coolant (e.g., oil) flow rate and coolant temperatures. The processing subsystem may utilize these inputs to estimate internal temperatures of the locking differentials and, specifically, of the differential clutch mechanisms within the locking differentials as a function of the differential clutch slip speed and the differential lock force; e.g., as calculated from the hydraulic pressure supplied to the differential clutch mechanisms when placed in a locked or semi-locked state. For example, in certain embodiments, the processing subsystem may estimate differential clutch temperatures utilizing a predictive temperature model, which is stored in memory and which may be developed utilizing empirical data gathered through controlled testing with thermo-coupled components similar or substantially identical to those of the locking differentials and liquid cooling system under consideration, as further discussed below.

In embodiments, the processing subsystem of the locking differential energy management system may compare the differential clutch temperature estimates to critical temperature threshold values stored in memory. If a calculated differential clutch temperature estimate exceeds a particular critical temperature threshold, the processing subsystem then executes one or more differential overtemperature actions in response to the detected overtemperature event. Various differential overtemperature actions are envisioned and can be tailored to best suit a particular work vehicle platform, application, or usage. This stated, the differential overtemperature actions selectively carried-out by the processing subsystem will often include one or more of: (i) temporarily boosting the heat dissipation capabilities of the differential clutch mechanisms (e.g., by increasing the rate of coolant flow through the locking differentials) to alleviate the overtemperature conditions; (ii) recording health data into a computer-readable memory (or reporting such data to a network-connected device or operations center) describing the severity, duration, or other parameters of the differential overtemperature events; (iii) generating alerts or other visual notifications advising a work vehicle operator and/or remotely-located personnel (e.g., a supervisor located at data center) of differential overtemperature events or related changes in differential health; and/or (iv) modifying the differential lock force (e.g., the hydraulic actuation pressure supplied to the locking differentials) to mitigate the overtemperature condition. With respect to romanette (iv), in particular, the processing subsystem may reduce the differential lock force to automatically move the differentials into unlocked states; or, instead, to move the locking differentials through any number of intermediate or partially-locked states until, for example, the differential overtemperature event subsides. Alternatively, in certain embodiments, the processing subsystem may temporarily increase the differential lock force to reduce or eliminate slippage, while maintaining the work vehicle differentials in a locked condition or state. Further description of example differential lock force adjustment schemes is set-forth below in connection with FIGS. 5 and 7.

Example embodiments of a locking differential energy management system onboard a work vehicle will now be discussed in detail in connection with FIGS. 1-7. While the example locking differential energy management system is principally described below in the context of a particular type of work vehicle or machine (namely, an articulated dump truck), embodiments of the locking differential energy management system can be utilized in conjunction with a wide range of work vehicles deployed in the construction, agriculture, forestry, and mining industries, as well as in other industrial contexts. Accordingly, the following description should be understood as merely providing a non-limiting example context in which embodiments of the present disclosure may be better understood.

Example Locking Differential Energy Management System and Associated Work Vehicle With initial reference to FIG. 1, an articulated dump truck 10 is equipped with a locking differential energy management system 12 in accordance with an example embodiment of the present disclosure. In addition to the locking differential energy management system 12, the dump truck 10 includes an articulated chassis 14, 16 having forward and rear frame sections 14, 16 joined via an articulation joint 18. The articulation joint 18 permits relative rotation or swiveling of the front and rear frame sections 14, 16 about an upright pivot axis as, for example, the articulated dump truck 10 turns; the pivot axis having a substantially vertical orientation (parallel to the Y-axis of a coordinate legend 20) when the dump truck 10 is on a level surface. An operator cabin 22 is supported by the front frame section 14 and contains various input or control devices, which collectively form an operator interface 24, enabling operator control of the articulated dump truck 10.

The operator interface 24 of the articulated dump truck 10 can include any combination of pedals, control levers or joysticks, physical buttons, switches, a steering wheel, and other such manual input devices commonly utilized in piloting work vehicles. The operator interface 24 may also include one or more display devices or in-cabin monitors for the generation of graphic user interfaces (GUI) including virtual instrument panels, which present operationally-relevant information to the work vehicle operator. Among other functions, the operator interface 24 enables an operator located in the operator cabin 22 to control the forward and rearward travel of the dump truck 10 through adjustments to the rotational speed and direction of a number of ground-engaging wheels 26. The ground-engaging wheels 26 are rotationally connected to a number of work vehicle axles (here, three work vehicle axles) such that the wheels 26 and the work vehicle axles corotate during travel of the articulated dump truck 10.

Generally, rotation of the work vehicle axles and the wheels 26 is driven by an engine located within a forward engine compartment 28. Rotation of the work vehicle axles and the wheels 26 may be slowed, in a controlled manner, utilizing a number of wet, hydraulically-controlled friction brake mechanisms 27 in accordance with operator input (e.g., depression of a brake pedal) utilizing the operator interface 24. The friction brake mechanisms are "wet" in the sense that oil (or another cooling lubricant) may be circulated through the friction brake mechanisms 27 for cooling purposes under the influence of a hydraulic pump 31, which is contained in a liquid cooling subsystem 30. The liquid cooling subsystem 30 also circulates the cooling lubricant through a number of locking differentials 66, which mechanically couple corresponding pairs of the axle half-shafts of the articulated dump truck 10, as described below in connection with FIG. 2. The locking differentials 66 each contain a suitable differential gearing arrangement 33, as well as friction clutch components 35 for selectively placing the differentials 66 in a locked state. Examples of the friction brake mechanisms 27 and, more pertinently, the locking differential 66 are further described below in connection with FIGS. 3 and 4.

The articulated chassis 14, 16 of the articulated dump truck 10 supports a relatively large open receptacle or bin 32. The bin 32 is pivotally mounted to rear frame section 16 utilizing a number of pin joint assemblies 34, which restrict bin movement to rotation about a transverse pivot axis (generally parallel to the Z-axis of the coordinate legend 20). Two hydraulic lift cylinders 36 (only one of which can be seen) are positioned on opposing sides of the bin 32 and mechanically coupled between the bin 32 and the rear frame section 16. The hydraulic lift cylinders 36 each include a cylinder end 38 and an opposing rod end 40. The cylinder end 38 of each lift cylinder 36 is pivotally joined to the rear frame section 16 at a location proximate the articulation joint 18, while the opposing rod end 40 is pivotally joined to a sidewall of the bin 32. When the bin 32 resides in a level transport orientation, as shown, the hydraulic lift cylinders 36 each remain in retracted position. When an operator commands the bin 32 to rotate into a tipped position, the lift cylinders 36 extend and the bin 32 rotates about the transverse pivot axis set by the pin joint assemblies 34. Accordingly, the bin 32 tilts away from the operator cabin 22 to form a tipping angle relative to a generally horizontal plane, which is parallel to the X-Z plane of the coordinate legend shown in the bottom left of FIG. 1. When the lift cylinders 36 fully extend, the bin 32 forms a maximum tipping angle of, for example, approximately 70 degrees)(° to empty any contents of the bin 32 into an area rearward of the articulated dump truck 10.

In additional to the operator interface 24 and the locking differentials 66, the locking differential energy management system 12 further includes a processing subsystem 42 and various onboard sensors 44. The data connections between the processing subsystem 42 and the components or subsystems of the locking differential energy management system 12 are symbolically denoted by signal communication lines 46, which may represent wireless connections, wired connections, or a combination thereof. The onboard sensors 44 contained in the locking differential energy management system 12 can include any number of axle speed sensors 48, hydraulic pressure sensors 50, and other sensors 52 useful in monitoring parameters considered by locking differential energy management system 12 in conducting the below-described locking differential energy management processes. Examples of each sensor type 48, 50, 52 are discussed below. In embodiments, one or more temperature sensors may be integrated into or otherwise associated with the locking differentials 66 for directly or indirectly gathering temperature data pertinent to the locking differentials 66. Such temperature data may indicate, for example, the upstream and/or downstream temperatures of oil or another liquid coolant, which is actively circulated through the locking differentials 66 and, perhaps, the friction brake mechanisms 27 of the articulated dump truck 10. Numerous other hydraulic components may further be included in the liquid cooling subsystem 30 as conventionally known including any combination of pumps (e.g., the hydraulic pump 31), sumps, valves, filters, conduits, and the like.

As appearing herein, the term "processing subsystem" is utilized in a non-limiting, generalized sense to broadly refer to the processing components of the locking differential energy management system 12, which cooperate to carry-out the processing and control functions described herein. The processing subsystem 42 can encompass or may be associated with any practical number of processors (central and graphical processing units), onboard control computers, controllers, navigational equipment pieces, computer-readable memories, power supplies, storage devices, interface cards, and other standardized components. Additionally, the processing subsystem 42 may include or cooperate with any number of firmware and software programs or computer-readable instructions designed to carry-out any pertinent process tasks, calculations, and control/display functions. The computer-readable instructions executed by the processing subsystem 42 may be stored within a non-volatile sector of a computer-readable memory 58 further included in the locking differential energy management system 12.

While generically illustrated as a single block in FIG. 1, the computer-readable memory 58 can encompass any number and type of storage media suitable for storing computer-readable code or instructions, as well as other data utilized to support locking differential energy management system operation. This may include the below-described critical temperature threshold data, as well as algorithms, functions, look-up tables, or other data structures utilized to convert locking differential levels into internal differential clutch temperature estimates, such as local separator plate or friction plate temperatures, as described below. Additionally, in instances in which the locking differential energy management system 12 carries-out certain prescribed actions (herein, "differential overtemperature actions") in response to the detection of differential overtemperature events or conditions, the computer-readable instructions stored in the memory 58 may specify the manner in which to perform such actions. Additional discussion of such locking differential management algorithms or processes is set-forth below in connection with FIGS. 5-7. First, however, example structural implementations of certain components of the dump truck 10 are described in conjunction with FIGS. 1-4 to provide a non-limiting context in which embodiments of the locking differential energy management system 12 may be better understood.

Figure 2:
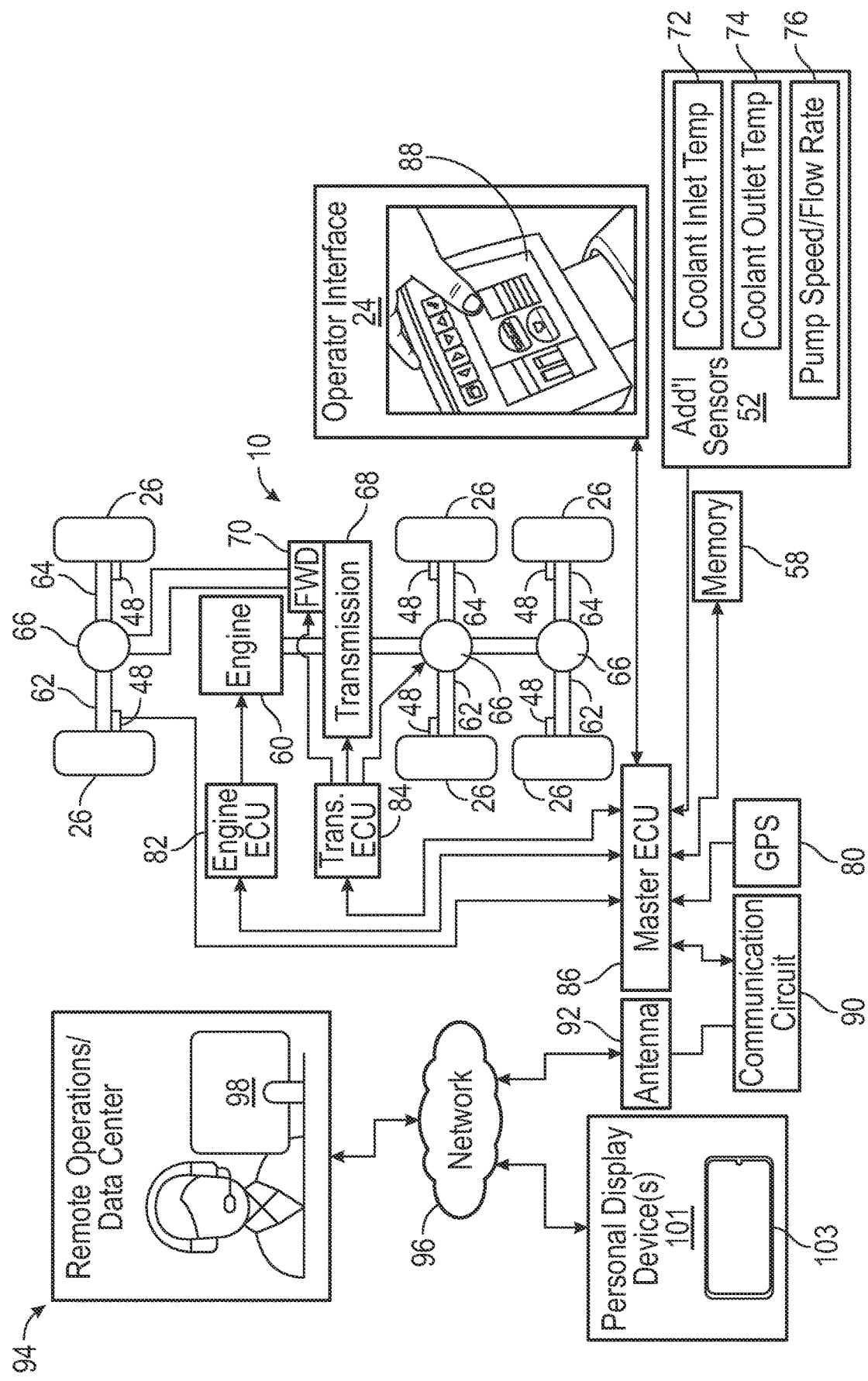
FIG. 2 is a schematic of certain components suitably included the locking differential energy management system of FIG. 1, as well as a remote operations center and one or more personal display devices in communication with the management system over a network, further illustrated in accordance with an example embodiment.

Referring now to FIG. 2 in conjunction with FIG. 1, an example implementation of the articulated dump truck 10 and the locking differential energy management system 12 is shown in greater detail. In this schematic diagram, the powertrain of the articulated dump truck 10 is illustrated as containing an engine 60, such as a heavy duty diesel engine, which drives rotation of a number of work vehicle axles 62, 64 through multiple locking differentials 66 and a transmission 68. The front axle 62, 64, specifically, is driven by the engine 60 through a front wheel drive (FWD) unit 70 included in, or otherwise mechanically connected to, an output shaft of the transmission 68. The work vehicle axles 62, 64 each contain a first half-shaft 62 and a second half-shaft 64, which are positioned in a coaxial relationship on either side of a locking differential. The half-shafts 62, 64 are mechanically joined to the primary driveline of the articulated dump truck 10 through the locking differentials 66, which may assume the form of electronically or electro-hydraulically controlled locking differentials in embodiments. Corresponding half-shaft pairs 62, 64 are thus mechanically coupled through the associated locking differentials 66. This mechanical coupling can be direct or indirect with any number of intervening components between the half-shafts 62, 64 and the locking differentials 66, such as the sun shafts and planetary gear reductions described below in connection with FIGS. 3 and 4.

When engaged or locked, the locking differentials 66 typically equalize the respective rotational rates of the corresponding half-shaft pairs 62, 64. Conversely, when disengaged or unlocked, the differentials 66 permit corresponding pairs of the half-shafts 62, 64, and therefore corresponding sets of the vehicle wheels 26, to rotate independently at different speeds. Considering, then, that the half-shafts 62, 64 are capable of rotating at disparate speeds, the two axle speed sensors 48 may be separately positioned to monitor the speed of each half-shaft 62, 64 included in a particular work vehicle axle 62, 64. Thus, as schematically depicted in FIG. 2, an axle speed sensor 48 may be configured to monitor the individual rotational rate of each of the half-shafts 62, 64 of the articulated dump truck 10, providing a total of up to six axle speed sensors 48 in the present example. In other instances, the axle speed sensors 48 may be positioned to monitor a lesser number of the work vehicle axles 62, 64, noting that the number and structural features of the work vehicle axles will vary between embodiments and with different work vehicle platforms. For example, in further implementations of an articulated dump truck (or other work vehicle) having three axles, adequate wheel slip monitoring can potentially be achieved via the provision of axle speed sensors on the front and rear axles, while such speed sensors are omitted from the middle axle of the dump truck.

The locking differential energy management system 12 may further contain any number and type of additional onboard sensors 52, which are operably coupled to (in signal communication with) the processing subsystem 42. As schematically depicted in the lower right of FIG. 2, such additional sensors 52 can include any combination of coolant (e.g., oil) inlet temperature sensors 72, coolant outlet temperature sensors 74, and onboard sensors 76 for directly or indirectly determining coolant flow rate through the locking differentials 66; e.g., by monitoring the speed and/or displacement (if variable) of the hydraulic pump 31, which can be combined with known parameters (pump displacement) to determine fluidic pump output. Such sensors may be operably coupled to the processing subsystem 42 through a vehicular bus or another data connection onboard the articulated dump truck 10. Similarly, the articulated dump truck 10 is further equipped with various sensors of the type commonly deployed onboard work vehicles. While not described in detail herein for concision, such additional sensors can include a global positioning system (GPS) unit 80 for tracking geographical positioning and motion state (e.g., speed and heading vectors) of the articulated dump truck 10. In many instances, the other work vehicle sensors may monitor parameters not directly applicable to the operation of the locking differential energy management system 12 itself. This notwithstanding, it is emphasized that input from any number and type of vehicle sensors (or the fusion of input from multiple sensors) may be considered by the locking differential energy management system 12 in monitoring overtemperature events, implementing appropriate responsive actions, and performing other related functions. As a specific example, in alternative implementations, data from a non-illustrated articulation angle sensor associated with articulation joint 18 may be considered by the differential energy management system 12 to aid in estimating slippage within the locking differentials at a particular articulation angle depending upon, for example, traction conditions and the differential locking forces applied.

As briefly described above, the processing subsystem 42 of the locking differential energy management system 12 can encompass any number of individual control units or controllers, which are operably interconnected and capable of performing the functions described herein. Further illustrating this point, FIG. 2 schematically depicts the articulated dump truck 10 as containing a number of electronic control units (ECUs), some or all of which may help form the processing subsystem 42 shown in FIG. 1. Here, the illustrated ECUs include an engine ECU 82, a transmission ECU 84, and a master ECU 86. The engine ECU 82 and the transmission ECU 84 generally control operation of the work vehicle engine 60 and the work vehicle transmission 68, respectively. The master ECU 86 is coupled to the engine ECU 82 and the transmission ECU 84 for bidirectional signal communication to synchronize, or to otherwise control, the operation of the ECUs 82, 84. Additionally, as indicated in FIG. 2, the master ECU 86 may receive data from, and transmit data to, various other components onboard the articulated dump truck 10 including, for example, the GPS unit 80, the computer-readable memory 58, the onboard sensors 52, at least one in-cabin monitor or display device 88 included in the operator interface 24, and a wireless network interface 90, 92.

When located onboard the dump truck 10, the wireless network interface 90, 92 can include a communications circuit or module 90 and an antenna 92. As schematically illustrated in FIG. 1, the communications network 96 broadly encompasses any number and type of networks, systems, or architectures for transmitting data between the articulated dump truck 10 and a remote operations data center 94. Accordingly, the communications network 96 can include one or more open content delivery networks, Virtual Private Networks (VPNs), the Internet, cellular networks, and other communications networks implemented in accordance with transmission control protocol/Internet protocol (TCP/IP) architectures or other conventional protocols. In various embodiments, the network 96 may further encompass one or more Local Area Networks (LANs), wide area networks (WANs), controller area networks (CANs), and similar wireless networks. In such instances, the locking differential energy management system 12 may selectively transmit data to the remote operations data center 94 to, for example, allow remote diagnostic or prognostic monitoring of the health and operational conditions of the locking differentials 66 onboard the articulated dump truck 10.

Additionally or alternatively, visual notifications of differential overtemperature events, or other visual indicators of differential health and/or service recommendations informed by the detection of differential overtemperature events, can be generated on a display device 98 located at the remote operations data center 94, as discussed below in connection with FIG. 6. Similarly, at least one personal display device 101, such as a laptop, tablet, or smartphone 103, may also be capable of communication with the data center 94 and/or the locking differential energy management system 12 over the communications network 96 in embodiments. In such embodiments, the below-described visual notifications can further be generated on the personal display device 101, which may be carried by a personnel member (e.g., an operator of the articulated dump truck 10) and which may execute a software application loaded onto the operating system of the display device 101, in addition to the notifications generated on the in-cabin display device 88 and/or the data center display terminal 98. Finally, in at least some implementations, certain processing tasks may be performed offboard the articulated dump truck 10 utilizing, for example, one or more servers associated with the remote operations data center 94 or otherwise in communication with the locking differential energy management system 12 over the network 96; while, in other instances, the below-described process steps may be wholly performed by the processing subsystem 42.

Embodiments of the locking differential energy management system 12 may advantageously leverage existing work vehicle sensors to facilitate adoption with minimal cost and alteration to existing work vehicle platforms. In this regard, axle speed sensors suitable for usage as the axle speed sensors 48 shown in FIGS. 1-2 are increasingly deployed onboard production work vehicles. Such axle speed sensors may utilize, for example, optical or magnetic sensing techniques to detect the proximity and passage of the ridges or spines on a splined shaft portion on each of the half-shafts 62, 64 to monitor axle rotational rates. Examples of sensors suitable for usage as the axle speed sensors 48 may be found in the following document, which is incorporated by reference: U.S. patent application Ser. No. 16/581,963, entitled "WHEEL SPEED SENSING SYSTEM," filed with the United States Patent and Trademark Office (USPTO) on Sep. 25, 2019, and published Mar. 25, 2021, as U.S. Pub. No. 2021/0086557 A1. In other instances, the axle speed sensors 48 may be configured to monitor the rotational speeds of the half-shafts 62, 64 in an indirect manner; e.g., by measuring the rotational speed of components (e.g., components within a planetary gear train), which are mechanically coupled to the axle half-shafts 62, 64 and which corotate with the half-shafts 62, 64 at the same rotational speed or at different rotational speeds. Similarly, embodiments of the present disclosure can incorporate known pressure sensors for measuring the below-described hydraulic locking or actuation pressures supplied to the locking differentials 66. So too may the locking differential energy management system 12 include any number and type of additional sensors 52 for measuring pertinent data parameters, such as temperature sensors 72, 74 for measuring oil temperatures, and sensors 76 for monitoring hydraulic pump speed and/or displacement to calculate coolant flow rate through the locking differentials 66 (when applicable). In other instances, such sensors may be omitted from embodiments of the present disclosure and/or such data inputs may be inferred from other data sources.

Figure 3:
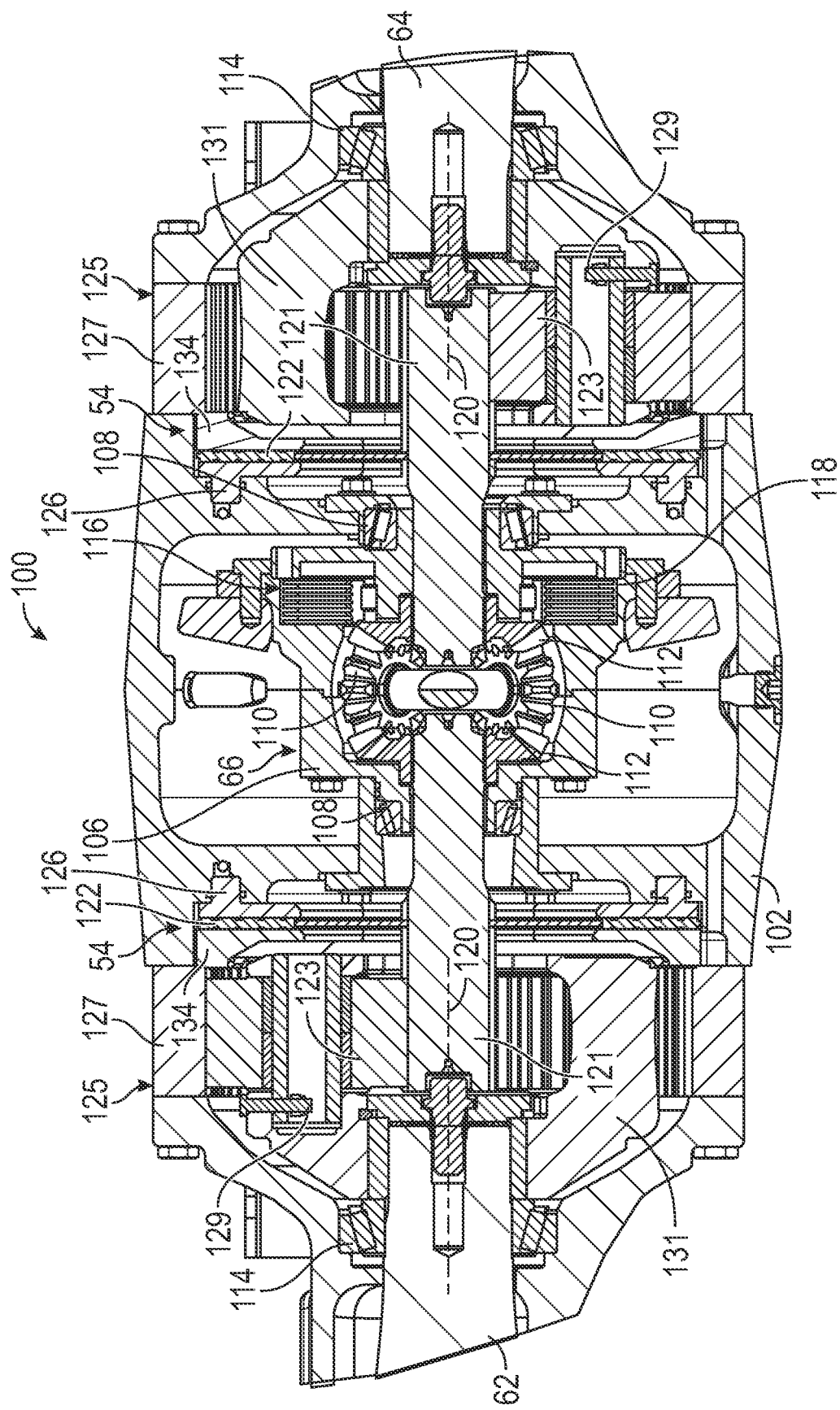
FIG. 3 is a cross-sectional view of an assembly including a locking differential and two friction brake mechanisms, multiple instances of which may be contained in the locking differential energy management system shown in FIGS. 1 and 2.

Turning to FIG. 3, a simplified cross-sectional view is presented of a work vehicle axle assembly 100 including two friction brake mechanisms 27, a hydraulically-actuated locking differential 66, and an assembly casing or housing 102. The illustrated locking differential 66 is centrally located between the friction brake mechanisms 27 and axle half-shafts 62, 64. The locking differential 66 contains, among other features, a differential gearing arrangement 110, 112 (corresponding to the differential gearing 33 generically shown in FIG. 1) and a differential clutch mechanism 116 (corresponding to the clutch components 35 generically shown in FIG. 1). The example locking differential 66 is described in more detail below in conjunction with FIGS. 3-4. First, however, the friction brake mechanisms 27 will be briefly described to provide a more complete description of the example axle assembly 100.

In the depicted embodiment, the friction brake mechanisms 27 are each imparted with single friction plate design and include a brake rotor disc 122, which is mechanically coupled to one of the axle half-shaft 62, 64 in a rotationally-fixed relationship. For example, in embodiments, each brake rotor disc 122 may be mounted to a sun shaft 121 utilizing a splined coupling. Each sun shaft 121 is, in turn, mechanically coupled to a corresponding axle half-shaft 62, 64 via the planetary gearing arrangement 125. As a result of this coupling, the sun shafts 121 each rotate at a slower rotational rate than the corresponding axle half-shafts 62, 64 due to the intervening planetary gear reduction. In addition to the sun shafts 121, each of the planetary gearing arrangements 125 includes a sun gear (e.g., formed as a single piece with the sun shaft 121), a ring gear 127, and a carrier assembly 123, 129, 131. The carrier assembly 123, 129, 131 includes, in turn, a carrier 131 and multiple planet gears 123, which are rotatably mounted to the carrier 131 utilizing a number of retainer pins 129. The planet gears 123 mesh with the corresponding sun and ring gears to provide the planetary gear system. In addition to the brake rotor disc 122, the friction brake mechanisms 27 each also include a hydraulically-actuated, annular piston 126 and a backing plate 134 disposed on opposing sides of the rotor disc 122. The annular piston 126 is slidably mounted within the housing assembly 102 at a location adjacent the rotor disc 122. The annular piston 126 may be biased toward a retracted position (e.g., by a non-illustrated retractor spring) such that the annular piston 126 normally does not contact the rotor disc 122, but is rather separated therefrom by a small axial gap, to allow the rotor disc 122 and its associated sun shaft 121 to rotate in a free or unimpeded manner. The axle half-shafts 62, 64 are supported by roller bearings 114, which further facilitate low resistance rotation of the half-shafts 62, 64 relative to the rotationally-grounded assembly housing 102 about the primary rotational axis 120 when the friction brake mechanisms 27 are not engaged or applied.

When an elevated brake apply pressure is supplied to a hydraulic control chamber within the housing assembly 102, the hydraulic fluid within the control chamber acting on the exposed area of each annular piston 126 rises to a sufficient level to overcome the spring bias force. This causes each of the annular pistons 126 to each slide or extend toward and press against the respective rotor discs 122. A clamping force is consequently exerted across the brake rotor disc 122 for each friction brake mechanism 27 as the friction-engagement face of the annular piston 126 presses the brake rotor disc 122 against the backing plate 134 (or another static structure) contained in the assembly housing 102. The resulting clamping force, and the associated frictional forces between the rotor disc 122, the annular piston 126, and the backing plate 134, impedes rotation of the brake rotor disc and the half-shaft to which the rotor disc 122 is mechanically coupled via the corresponding sun shaft 121 and the planetary gearing arrangement 125. A braking effect is thus produced to slow rotation of the work vehicle axle when the work vehicle (e.g., the articulated dump truck 10 shown in FIGS. 1-2) is in motion. In other instances, the friction brake mechanism 27 can possess a different construction or design, providing the brake mechanism 27 is controllable to impede rotation of a work vehicle axle through selectively frictional engagement between rotating and non-rotating components of the brake mechanism.

Figure 4:
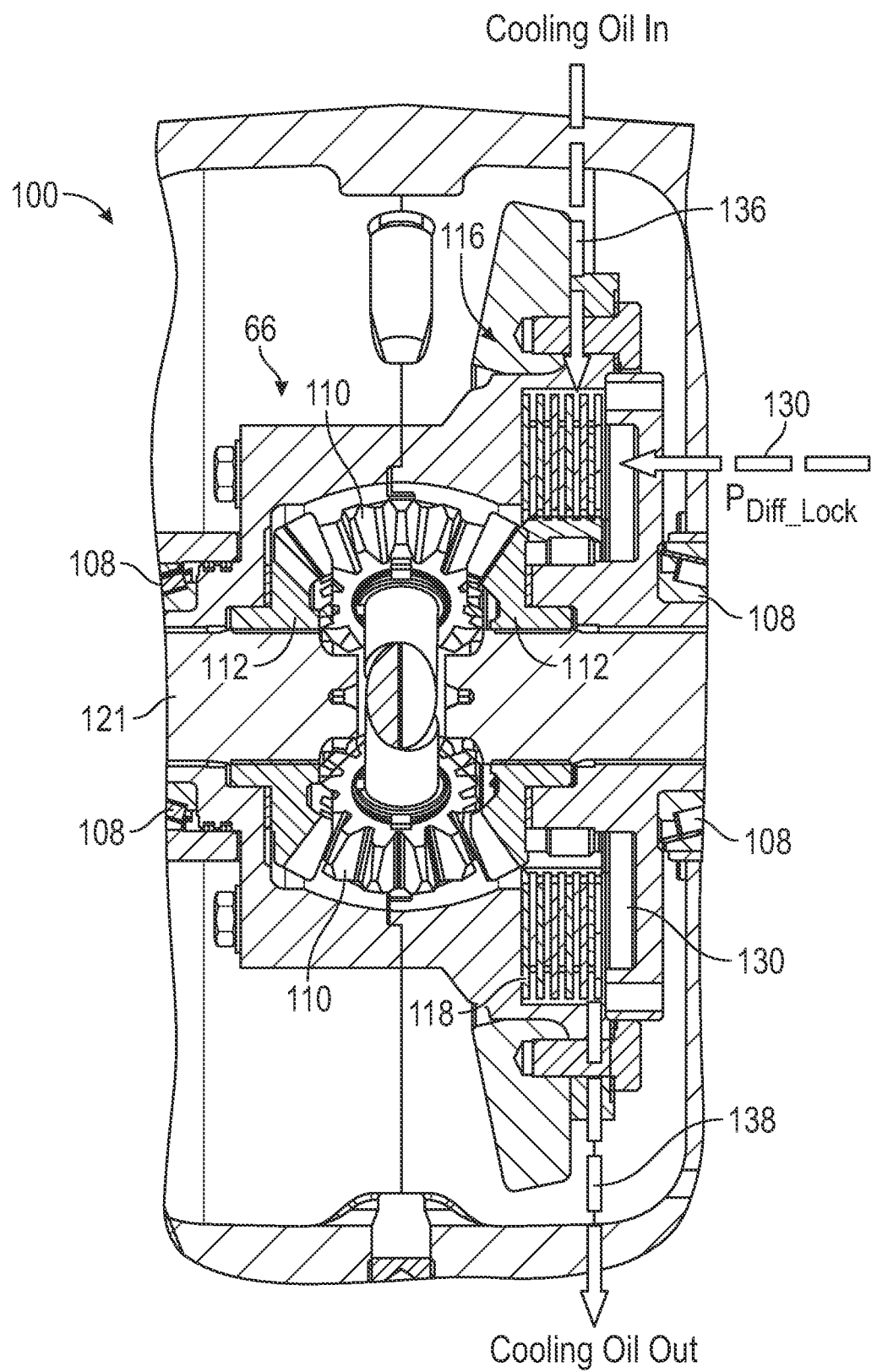
FIG. 4 is a cross-sectional view of a portion of the assembly shown in FIG. 3 illustrating the example locking differential in greater detail.

Referring now to FIG. 4 in conjunction with FIG. 3, the example locking differential 66 are described in greater detail. Here, certain gears included in the example gearing arrangement 110, 112 are not visible; however, gearing arrangements suitable for usage as the gearing arrangement 110, 112 are well-known and can vary between embodiments. This stated, it can be seen that example differential gearing arrangement 110, 112 includes multiple spider or pinion gears 110, which mesh with two side gears 112. The side gears 112 are splined to or otherwise rotationally affixed to sun shafts 121, which are, in turn, each mechanically coupled to a different axle half-shaft 62, 64; here, through two planetary gear sets 125, as previously discussed. A differential carrier 106, which is rotatable relative to the assembly housing 102 about a primary rotational axis 120, supports the pinion gears 110. While only two pinion gears 110 can be seen in the illustrated cross-section, the differential gearing arrangement 110, 112 may contain three or more pinion gears 110 for increased torque capacity in embodiments. A number of roller bearings 108 are provided at appropriate interfaces within the axle assembly 100 to support rotation of the differential carrier 106.

The differential clutch mechanism 116 is normally maintained in a disengaged or unlocked state utilizing, for example, a non-illustrated retractor spring. While the locking differential 66 remains unlocked, the differential side gears 112 are able to freely rotate relative to the differential carrier 106 about the primary rotational axis 120. This frees the sun shafts 121 and the corresponding axle half-shafts 62, 64 to spin at different rotational speeds. When the locking differential 66 is desirably placed in a locked state, an elevated hydraulic pressure is applied to the differential clutch mechanism 116 to extend or stroke a hydraulic piston and apply a relatively high clamp force across a multidisc clutch pack 118 within the clutch mechanism 116. The hydraulic actuation pressure supplied to the control chamber of the differential clutch mechanism 116 is represented in FIG. 4 by an arrow 130 labeled "$P_{DIFF\_LOCK}$." This places the locking differential 66 in a locked state by forcing the side gears 112 to corotate with the differential carrier 106, with the locking differential 66 then rotating as a single unit about the primary rotational axis 120. Absent appreciable slippage within the clutch pack 118, the rotational speeds of the axle half-shafts 62, 64 are equalized or unified until the locking differential 66 is again transitioned to an unlocked state.

Relatively high frictional forces may develop across the contacting surfaces of the differential clutch mechanism 116 in the presence of slippage between the rotating and the non-rotating components (e.g., separator plates and friction discs) of the clutch mechanism 116. Such frictional forces are converted to waste heat, which can rapidly accumulate within the locking differential 66 and lead to differential overtemperature conditions if not adequately compensated. To reduce the accumulation of heat, the differential clutch mechanism 116 and, more generally, the locking differential 66 is actively cooled utilizing a cooling lubricant, such as oil. The coolant supplied via inlet and outlet passages, which receive and discharge coolant inflow and outflow, respectively, as indicated by arrows 136, 138 in FIG. 4. Such a cooling scheme allows the active circulation of a liquid coolant, such as oil, through the differential clutch mechanism cavity in which multidisc clutch pack 118 is housed. As the coolant flows through the cavity, the coolant contacts the differential clutch mechanism 116, such as the friction engagement surfaces of the components (e.g., separator plates and friction discs) of multidisc clutch pack 118, to conductively remove excess heat therefrom and provide the desired cooling effect.

The above-described active liquid cooling provided to each of the locking differentials 66 is typically sufficient to maintain the differential clutch components within acceptable temperature ranges and prolong the operational lifespan of these components, particularly the differential clutch pack 116. During differential overtemperature events, however, highly elevated local temperatures can develop within the locking differentials 66 due to the rapid generation of large quantities of heat, which outpace the heat removal capacity of the liquid cooling system. At certain elevated temperatures, undesired breakdown or degradation of the liquid coolant (e.g., oil) circulated through the locking differentials 66 can occur. This may result in the local deposit of contaminants (e.g., carbon or coke) over the friction material provided along contacting faces of differential clutch components. This, in turn, may reduce the efficacy of the locking differentials 66 in equalizing or unifying the respective rotational speeds of the axle half-shafts 62, 64 when subsequently moved into a locked state.

To minimize differential overtemperature events and prolong the operational lifespan of the differential clutch components, the locking differential energy management system 12 carries-out an algorithm or computer-implemented process (herein, a "locking differential energy management method") during operation of the articulated dump truck 10. One such locking differential energy management method 140 is set-forth in FIG. 5 and depicted in accordance with an example embodiment of the present disclosure. The example locking differential energy management method 140 includes several process steps 144, 146, 148, 150, 152, 154 each of which is described, in turn, below. Depending upon the particular manner in which the locking differential energy management method 140 is implemented, each step generically illustrated in FIG. 5 may entail a single process or multiple sub-processes. Further, the steps illustrated in FIG. 5 and described below are provided by way of non-limiting example only. In alternative embodiments of the locking differential energy management method 140, additional process steps may be performed, certain steps may be omitted, and/or the illustrated process steps may be performed in alternative sequences.

The example locking differential energy management method 140 commences at step 142 in response to the occurrence of a predetermined trigger event. Generally, such a trigger event may be placement of, or the desired placement of, one or all of the locking differentials 66 (FIGS. 1-4) in a locked state. Alternatively, the trigger event may be more selective such that the locking differential energy management method 140 is conducted exclusively when the articulated dump truck 10 is traveling above a particular speed threshold and the locking differentials 66 are locked or are desirably locked. In still other instances, a different trigger event may be utilized. Regardless of the particular trigger event or events employed, after commencing the locking differential energy management method 140, the processing subsystem 42 progresses to step 144 and collects input data from one or more data sources onboard the work vehicle. In effect, during step 144, the processing subsystem 42 gathers the information utilized in performing the remainder of the locking differential energy management method 140.

As indicated above, the particular data parameters collected by the processing subsystem 42 during step 144 will vary among embodiments of the present disclosure. This stated, the processing subsystem 42 may gather data from the axle speed sensors 48 (FIG. 2) monitoring the respective rotational speeds of the half-axles 62, 64, as well as data indicative of the differential lock force; e.g., data from at least one hydraulic pressure sensor (e.g., the sensor 50, FIG. 1) monitoring the differential actuation or locking pressure supplied to the differential clutch mechanisms 116. In certain cases, the processing subsystem 42 may also collect data indicative of the current heat dissipation capabilities of the active cooling system utilized to circulate oil or another liquid coolant through the locking differentials 66. For example, in this latter regard, such data may describe or indicate current coolant temperatures and the coolant flow rate through the locking differentials 66; e.g., as measured utilizing the sensors 52, 76 (FIGS. 1-2) in the manner previously described.

Next, at step 148 of the method 140, the processing subsystem 42 estimates the current internal clutch temperature of the differential clutch mechanisms 116. In one approach, the processing subsystem 42 utilizes the rotational rate data reported by the axle speed sensors 48 to monitor the differential clutch slip speeds, as calculated as the difference or delta between the respective rotational rates of corresponding half-shaft pairs 62, 64. In some realizations, the processing subsystem 42 may assume equal conditions for all, or a subset of, the locking differentials 66. In other implementations, the processing subsystem 42 may separately consider each locking differential 66 onboard the articulated dump truck 10 (or other work vehicle) when carrying-out method 140. The processing subsystem 42 then estimates the current internal temperatures of the locking differentials 66 (and, specifically, of the differential clutch mechanisms 116) based, at least in part, on the differential clutch slip speed and the differential locking pressure reported by the hydraulic pressure sensor(s) 50. Also, as previously noted, the processing subsystem 42 may also consider other parameters impacting the active liquid cooling of the locking differentials 66. This may include parameters pertaining the coolant (e.g., oil) circulated through the locking differentials 66, such as the coolant inlet temperature, coolant outlet or exit temperature, and/or the current coolant flow rate through the locking differentials 66. With respect to the coolant flow rate, in particular, this may be sensed directly utilizing a flow rate sensor; or, instead, calculated based upon hydraulic pump speed (e.g., the speed of the hydraulic pump 31 shown in FIG. 1) and known pump displacement characteristics or monitored pump displacement in instances in which the hydraulic pump 31 assumes the form of a variable displacement pump.

Continuing the description above, in embodiments, the processing subsystem 42 estimates the internal temperatures in terms of the total energy content of the differential clutch mechanisms 116 within the locking differentials 66, as this energy content varies over time. To this end, the processing subsystem 42 may initially determine the differential lock force exerted across the friction interfaces or clutch components of the differential clutch mechanisms 116 as a function of (i) the current differential actuation or locking pressure ($P_{DIFF\_LOCK}$) supplied to the differential clutch mechanisms 116, and (ii) the effective area of the annular piston in each of the locking differentials 66. The effective area of the annular piston in each of the locking differentials 66 is a known parameter, while the differential locking pressure is a variable input determined from sensor input (again, provided by the pressure sensor(s) 50). A suitable formula or equation can be readily established, stored in the computer-readable memory 58, and utilized by the processing subsystem 42 to determine the estimated locking differential input based upon the differential locking pressure reported by sensors 50 (FIG. 1).

Next, embodiments of the processing subsystem 42 estimate the energy dissipation through the differential clutch mechanisms 116 due to frictional conversion to heat given the current degree of differential clutch slippage, again as determined by the delta or difference between the monitored rotational rates of the axle half-shafts 62, 64. In this manner, the heat input into the locking differentials 66 can be determined. To more accurately track the net energy content of the locking differentials 66, the heat output withdrawn from the locking differentials 66 may further be considered, in embodiments, by the processing subsystem 42. In particular, the processing subsystem 42 may consider the amount of heat removed from the differential clutch mechanisms 116 by the liquid cooling system, noting that heat removal by convection to the ambient air will often be negligible (although this may also be considered by the processing subsystem 42 in certain instances). In at least some instances, the heat dissipation capabilities of the active cooling system may be assigned a fixed value defining a quantity of heat carried away due to transportation by the liquid coolant circulated through the locking differentials 66. In other instances, the current coolant flow rate, coolant inlet temperature, and/or coolant outlet temperature may be considered by the processing subsystem 42 to more accurately estimate heat removal by active cooling of the locking differentials 66 and the differential clutch mechanisms 116. The resulting net thermal energy of the differential clutch mechanisms, as tracked over time, can then be utilized to estimate the current internal temperatures of the differential clutch mechanisms 116.

In the above-described manner, the processing subsystem 42 of the locking differential energy management system 12 can readily estimate the internal differential clutch temperatures of the differential clutch mechanisms 116 with a relatively high degree of accuracy utilizing onboard sensor inputs. For example, in embodiments, the processing subsystem 42 may estimate the internal differential clutch temperatures of the differential clutch mechanisms 116 utilizing a pre-established predictive temperature model, which factors in the calculated locking differential and one or all of the above-noted coolant parameters; e.g., coolant flow rate, coolant inlet temperature, and/or coolant outlet temperature. In such embodiments, the predictive temperature model can be stored within the memory 58 as any suitable data structure (e.g., a multi-dimensional lookup table or as a mathematical function) and may be developed utilizing empirical data gathered through control testing with thermo-coupled components (e.g., the separator plate or plates) to create a model unique to the particular work vehicle axle and locking differential under consideration. Stated differently, a predictive temperature model may be constructed utilizing empirical testing carried-out with a test rig or bench in which the internal temperature of the model locking differential (or differential clutch mechanism) may be mapped for a range of differential clutch slip speeds, differential locking pressures, and possibly coolant flow conditions. As the quantities of heat generated under high energy differential clutch slippage conditions outpaces the heat removal capabilities of the active liquid cooling system, heat accumulates within the locking differential 66. The internal differential clutch temperatures can consequently rapidly rise under such conditions and can potentially surpass critical temperature thresholds resulting in differential overtemperature events. To sense or detect such differential overtemperature events and react accordingly, the processing subsystem 42 next advances to step 148 of the locking differential energy management method 140.

After estimating the internal clutch temperature or temperatures of the differential clutch mechanisms 116, the processing subsystem 42 determines whether the internal clutch temperature exceeds one or more critical temperature thresholds stored in the computer-readable memory 58 (step 148, method 140). If determining that the calculated internal clutch temperature exceeds at least one of the critical temperature thresholds stored in the memory 58, the processing subsystem 42 progresses to step 150 of the locking differential energy management method 140. Otherwise, the processing subsystem 42 continues to step 152 of the method 140 and determines whether the current iteration of the locking differential energy management method 140 should terminate; e.g., due to removal of the trigger condition considered during step 142 of the method 140. If determining that the locking differential energy management method 140 should terminate at step 152, the processing subsystem 42 progresses to step 154 of the method 140, and the method 140 terminates accordingly. If instead determining that the locking differential energy management method 140 should continue, the processing subsystem 42 returns to step 144 and the above-described process steps repeat or loop.

When determining that the newly-calculated or estimated internal differential clutch temperature exceeds a critical temperature threshold stored in the computer-readable memory 58, the processing subsystem 42 of the locking differential energy management system 12 advances to step 150 and performs one or more differential overtemperature actions. By way of non-limiting illustration, four examples of such differential overtemperature actions 155, 156, 158, 160 are set-forth in FIG. 5 and described below. Any combination of the differential overtemperature actions 155, 156, 158, 160 may be performed in embodiments; and, in instances in which the processing subsystem 42 monitors for the exceedance of multiple critical temperature thresholds, certain differential overtemperature actions 155, 156, 158, 160 may only be performed in response to exceedance of higher temperature thresholds by the estimated internal temperatures within the differential clutch mechanisms 116.

Figure 5:
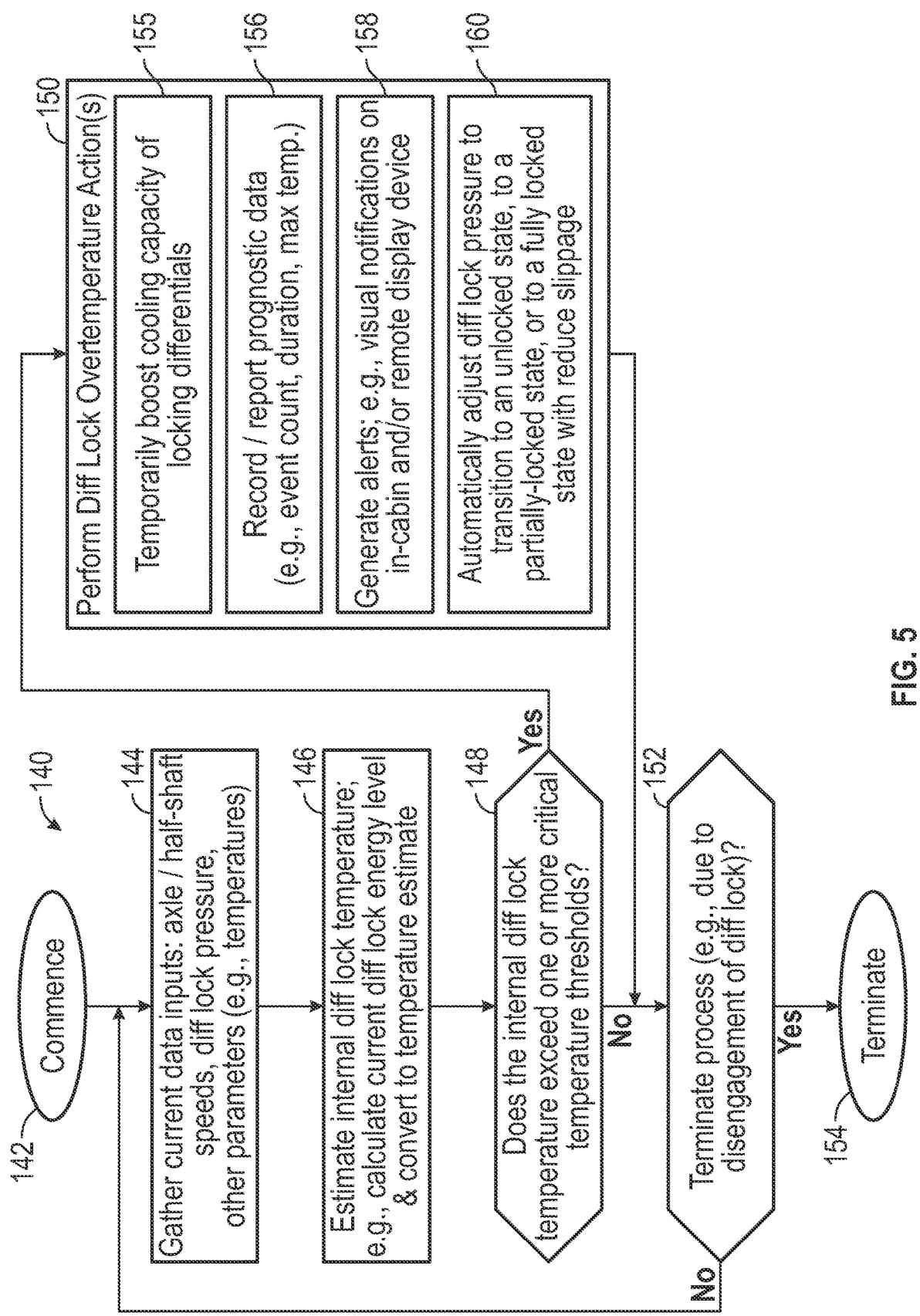
FIG. 5 is a flowchart of an example locking differential energy management process suitably carried-out by the processing subsystem of the management system (FIGS. 1-3) to monitor estimated temperatures within one or more differential clutch mechanisms and perform certain responsive actions when detecting differential overtemperature conditions.

Initially addressing the first-listed differential overtemperature action 155 in FIG. 5, during a differential overtemperature event, the processing subsystem 42 may take certain actions to temporarily boost the cooling capacity (heat dissipation capabilities) of the liquid cooling system as it pertains to the differential clutch mechanisms 116. In many instances, the processing subsystem 42 may perform one or more actions to temporarily increase the output of the hydraulic pump 31 and, therefore, increase the rate of coolant flow through the differential clutch mechanisms 116; e.g., by increasing the speed of the hydraulic pump 31 when assuming the form of a fixed displacement pump and/or by controlling the hydraulic pump 31 (e.g., through angular adjustments to a swash plate) when assuming the form of an axial piston pump or another variable displacement pump. By increasing the rate of coolant flow (e.g., cooling oil flow) through the differential clutch mechanisms 116 in this manner, a greater quantity of heat is transported away from the differential clutch mechanisms 116 over a given span of time, thus resulting in desired boost in cooling. Additionally or alternatively to increasing the output of the hydraulic pump 31, if valving or other components are available to reroute a greater volume of coolant flow (or coolant flow having a lower inlet temperature) through the differential clutch mechanisms 116, the processing subsystem 42 may control the appropriate components to accomplish this effect. The processing subsystem 42 may then maintain the active cooling system in such a high cooling capacity mode until the estimated internal temperatures within the differential clutch mechanisms 116 again decrease to within acceptable limits.

In addition to or in lieu of boosting the cooling capacity of the differential clutch mechanisms 116 during a differential overtemperature event, the processing subsystem 42 can record data into the computer-readable memory 58 for subsequent diagnostic or prognostic purposes (differential overtemperature action 156). Additionally or alternatively, the processing subsystem 42 may report such data to the remote operations data center 94 via wireless transmission over the network 96 of the pertinent data describing the differential overtemperature event, whether such data is transmitted in real-time during the overtemperature event or at a juncture subsequent thereto. In either case, various parameters pertaining to detected differential overtemperature events and useful in evaluating the health of the differential clutch mechanisms 116 can be recorded and/or shared with the remote operations data center 94. A non-exhaustive list of such parameters includes time-correlated temperature estimates during the differential overtemperature events, data indicative of the severity (e.g., the durations and/or peak temperatures) of differential overtemperature events, and information identifying the differential clutch mechanisms 116 to which the differential overtemperature data applies if the differential clutch mechanisms 116 are distinguished from one another in this respect. Additionally, embodiments of the processing subsystem 42 may maintain a running tally or count of the number of overtemperature events occurring for the differential clutch mechanisms 116 since last servicing and/or may record other information (e.g., operator identification pins) useful in assessing the performance of an operator in piloting the work vehicle. Such data may be subsequently retrieved from the computer-readable memory 58 or analyzed at the network-connected data center 94 for prognostic or diagnostic purposes; e.g., to accelerate or otherwise adjust the scheduled servicing of the differential clutch mechanisms 116 and other components of the locking differentials 66 (FIG. 1), as appropriate.

Addressing the third differential overtemperature action 158 set-forth in the example method 140 (FIG. 5), the processing subsystem 42 of the locking differential energy management system 12 may further provide visual feedback to a local operator or to a remote entity (e.g., a dealer or the service center 94) notifying certain parties, in real-time, of differential overtemperature events or degradations in differential health resulting from the occurrence of such events. For example, in embodiments, graded alerts or visual notification may be generated on an in-cabin display device (e.g., the in-cabin display device 88 shown in FIG. 2) and/or via a remotely-located display device (e.g., the data center display device 98 or the personal display device 101) indicative of the occurrence and severity of differential overtemperature events (or resulting health degradations to the locking differentials 66). In such instances, the processing subsystem 42 may determine whether the estimated internal differential clutch temperature of the differential clutch mechanisms 116 exceeds: (i) a first critical temperature threshold stored in the computer-readable memory 58 indicative of overtemperature events of low or moderate severity; and (ii) a second critical temperature threshold, which is further stored in the memory 58, exceeds the first critical temperature threshold, and is indicative of higher severity overtemperature events.

If, during step 158 of method 140 (FIG. 5), the processing subsystem 42 determines that the current estimated internal differential clutch temperature exceeds the first critical temperature threshold, while remaining below the second critical temperature threshold, the processing subsystem 42 may generate a low level alert on one or more display devices associated with the work vehicle in question; e.g., any combination of the display devices 88, 98, and 101 associated with the articulated dump truck 10 shown in FIGS. 1-2. If, instead, the estimated internal differential clutch temperature exceeds both the first and second critical temperature thresholds, the processing subsystem 42 may generate or cause the generation of a more urgent, high level alert on the appropriate display devices; e.g., the in-cabin display device 88, the remotely-located display device 98, and/or the personal display device 101 shown in FIG. 2. Additionally or alternatively, a text annunciation, a symbol, or another visual cue may be produced on the appropriate display device(s) alerting the work machine operator, a supervisor, or other parties that the locking efficacy of the locking differential 66 may be diminished and recommending prompt servicing of the locking differential system.

Figure 6:
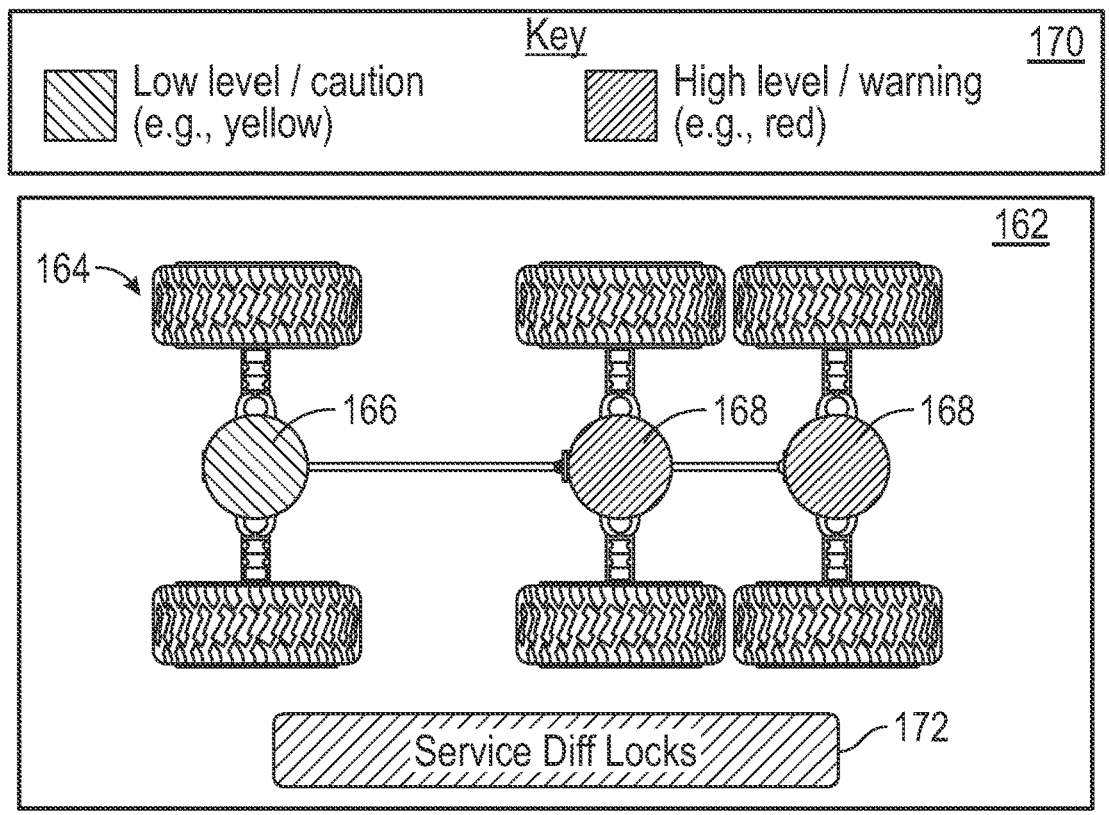
FIG. 6 illustrates an example display including symbology indicative of differential overtemperature events or differential clutch health, which may be generated on a display device associated with the energy management system in embodiments.

An example of a graphic display 162 including notifications of overtemperature events is shown in FIG. 6. As can be seen, any number of symbols or icons 166, 168 may be generated on the display 162 and overlaid onto appropriate locations of a powertrain graphic 164 to denote the severity of detected differential overtemperature events, as well as to visually identify the particular locking differentials 66 to which the overtemperature events pertain. For example, as indicated by a key 170, the icons 166, 168 may be color coded or otherwise visually distinguished to denote the severity of a detected differential overtemperature event (or resulting variations in differential health). Specifically, in this example, the icons 166 may be generated in a first coded color (e.g., yellow) to indicate a mild or less severe differential overtemperature temperature event (or a lesser degree of potential differential clutch degradation due to the detected overtemperature event). Comparatively, icons 168 may be generated in a second, increasingly striking coded color (e.g., red) to denote the occurrence of a severe differential overtemperature event (or a larger degree of differential clutch degradation due to the detected overtemperature event). In other instances, icons denoting different levels of differential overtemperature events may be visually distinguished in another manner; e.g., through variations in icon shape, icon size, or via the application of animation effects, such as a flashing effect. In the case of severe overtemperature events, audible or haptic alerts can be generated in conjunction with the visual notifications produced on the appropriate displays, such as in-cabin display device 88. Further, a text annunciation or pop-up 172 may be generated advising the viewer that servicing of the locking differentials 66 may be warranted in response to severe differential overtemperature events. In other implementations, the example display 162 can differ in appearance or symbology, and various additional gradients or categories of differential overtemperature alerts may be generated.

Figure 7:
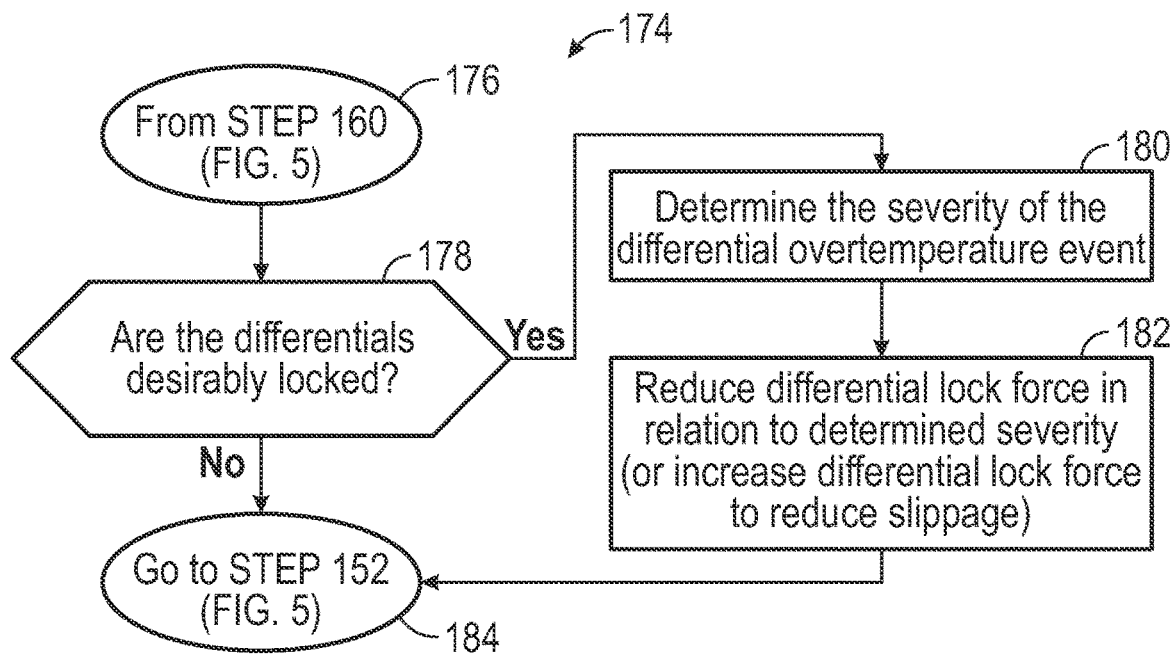
FIG. 7 is a flowchart of an example lock force variation subprocess suitably carried-out in embodiments of the locking differential energy management process set-forth in FIG. 4.

Addressing lastly the differential overtemperature action 160 shown in FIG. 5, a lock force variation subprocess can also be performed during step 150 of the locking differential energy management method 140 in certain embodiments of the present disclosure; e.g., when a variable flow control valve (rather than a bistable shutoff valve) is utilized to control the flow of hydraulic fluid to the control chambers of the differential clutch mechanisms 116 (again, represented in FIG. 4 by the arrow 130). An example of such a lock force variation subprocess 174 is shown in FIG. 7 and includes steps 176, 178, 180, 182. In the below-described example, the processing subsystem 42 reduces the differential lock force in response to an overtemperature event to transition the locking differential(s) subject to the overtemperature event into unlocked or partially-locked positions. In other embodiments, and as indicated in FIG. 5, the processing subsystem 42 may instead increase the differential lock force (e.g., via an increase in the hydraulic actuation pressure supplied to the hydraulically-actuated locking differentials 66) to reduce differential clutch slippage, while maintaining the locking differentials 66 in a locked state. Further, in at least some instances, such variations or adjustments in differential lock force can be varied over time or as a sequence. For example, in this later regard, embodiments of the processing subsystem 42 may initially attempt to reduce differential clutch slippage and the associated frictional heat generation by boosting the differential lock force. However, if this action does not lower the estimated internal temperatures within the locking differentials 66 with sufficient rapidity, the processing subsystem 42 may then resort to decreasing the differential lock force to an intermediate or minimal value to transition the locking differentials 66 to partially-locked or unlocked states.

Referring now to FIG. 7 in conjunction with FIG. 5, the example lock force variation subprocess 174 commences at step 176, which coincides with step 160 of the master method 140. After commencing the lock force variation subprocess 174, the processing subsystem 42 determines whether the variable differential lock function is currently active or engaged (step 178). If the answer to this query is "no," the processing subsystem 42 advances to step 154 of the method 140 (FIG. 5), as previously described. Otherwise, the processing subsystem 42 progresses to step 180 (FIG. 7) and determines the severity of the differential overtemperature event. For example, the processing subsystem 42 may categorize the overtemperature event as mild, moderate, or serve depending upon the degree to which the estimated temperature within the differential clutch mechanisms 116 exceeds one or more predetermined thresholds.

Next, the processing subsystem 42 advances to step 182 and potentially reduces the differential lock force; here, the actuation pressure supplied to the differential clutch mechanisms 116). In at least some instances, the processing subsystem 42 beneficially reduces the differential lock force in relation to the determined severity of the current overtemperature event. For example, if the overtemperature event is categorized as mild, the processing subsystem 42 may reduce the hydraulic pressure supplied to the locking differentials 66 by a relatively minor amount, effectively transitioning the locking differentials 66 to a partially locked state in which a relatively high clamp force is still exerted across the differential clutch mechanisms 116. If instead categorizing the overtemperature event as moderate, the processing subsystem 42 may reduce the hydraulic pressure supplied to the locking differentials 66 by an intermediate amount, effectively transitioning the locking differentials 66 to a partially locked state in which a moderate clamp force is still exerted across the differential clutch mechanisms 116. Conversely, if categorizing the overtemperature event as severe, the processing subsystem 42 may reduce the hydraulic pressure supplied to the locking differentials 66 to a minimal value to return the locking differentials 66 to an unlocked state. In other embodiments, a lesser number or a greater number of discrete thresholds may be utilized for modifying the actuation pressure supplied to the locking differentials 66; or the processing subsystem 42 may reduce the actuation pressure supplied to the locking differentials 66 in proportion to the degree to which the estimated internal temperatures within the differential clutch mechanisms 116 exceed a baseline value.

With continued reference to FIGS. 1-7, and referred specifically to FIGS. 5 and 7, the processing subsystem 42 of the locking differential energy management system 12 next advances to STEP 184 of the lock force variation subprocess 174 (FIG. 7). This step of the lock force variation subprocess 174 coincides with step 152 of the larger locking differential energy management method 140, as discussed above. Absent a determination by the processing subsystem 42 that the method 140 should terminate at step 152 (FIG. 5), the locking differential energy management method 140 returns to step 144 and the above-described process steps repeat or loop. Additionally, in embodiments in which the processing subsystem 42 is configured to partially reduce or remove the differential lock force supplied to the locking differentials 66 as discussed in connection with the lock force variation subprocess 174 (FIG. 7), the processing subsystem 42 may further perform the following steps during subsequent iterations of the method 140: (i) after partially reducing or removing the differential lock force (here, the hydraulic actuation pressure supplied to each locking differential 66), monitor whether the internal differential clutch temperature decreases below the first critical temperature threshold by a predetermined amount while the locking differentials 66 are still desirably locked; and (ii) restore the differential lock force (hydraulic actuation pressure) to a maximum value if the internal differential clutch temperature decreases below the first critical temperature threshold by the predetermined amount while the locking differentials 66 are still desirably locked.

In the above-described manner, by repeating the above-described steps in the present embodiment, the processing subsystem 42 continually estimates or tracks the internal temperatures of the differential clutch mechanisms 116 (e.g., in real-time or near real-time) and conducts tailored actions when detecting differential overtemperature events depending upon, for example, the severity of the detected differential overtemperature event. As previously stated, any number or combination of overtemperature actions, including any combination of the overtemperature actions 155, 156, 158, 160 set-forth in FIG. 5, can be carried-out in response to the detection of a differential overtemperature event in embodiments of the present disclosure. Further, through the above-described differential overtemperature actions, proper machine operation can be encouraged (e.g., via the above-described visual notifications) to improve axle and diff lock system reliability. Work machine uptime may be boosted by better protecting differential health and reducing maintenance needs. Further, the above-described locking differential energy management processes, including processes similar or substantially identical to the lock force variation subprocess 174 described above in connection with FIG. 7, may be leveraged in the context of fully or semi-autonomous work vehicles to refine locking differential control schemes to further maximize work vehicle uptime, productivity, and durability.

CONCLUSION

There has thus been provided locking differential energy management systems for usage onboard work vehicles. Embodiments of the energy management system provide management, prognostic, and protective functions to minimize work vehicle maintenance needs, improve axle reliability, and otherwise boost work vehicle uptime. In embodiments, prognostic data pertaining to differential overtemperature events may be stored in memory and tallied to more accurately assess differential clutch health status and to better inform optimal maintenance practices, such as through refinement of service scheduling. So too may such data be sent to network-connected data centers to remotely track work vehicle differential health and provide customized service recommendations to the work vehicle servicing schedule. Notifications of differential overtemperature events and/or service recommendations may further be generated on display devices associated with a given work vehicle to improve operator awareness of such overtemperature events and current differential health or capacity. In implementations in which a given work vehicle has a variable or continuous (rather than bistable) differential lock functionality, certain differential lock auto-engagement subprocesses may be carried-out by the processing subsystem of the energy management system to better preserve differential health through tailored modifications to differential locking pressures. Finally, in the context of fully and semi-autonomous work vehicles, the presently-disclosed computer-implemented processes can be leveraged to improve operational commands related to differential lock control to further maximize work vehicle uptime, productivity, and durability.

In embodiments, the presently-disclosed locking differential energy management system includes axle speed sensors configured to monitor the rotational speeds of axle half-shafts of a work vehicle. Such monitoring can occur directly or indirectly by, for example, measuring the rotational speed of other components (e.g., a sun shaft or a carrier in a planetary gear reduction) mechanically coupled to the half-shafts in a corotational relationship. The locking differential energy management system may also include a locking differential, a computer-readable memory, and a processing subsystem. The axle half-shafts are mechanically coupled through the locking differential; e.g., in embodiment, the axle half-shafts may be mechanically coupled through the locking differential and any number of intervening components, such as sun shafts and planetary gearing systems of the type described above in connection with FIGS. 3 and 4. The processing subsystem is configured to: (i) when the locking differential is placed in a locked state utilizing a differential clutch mechanism within the locking differential, calculate a differential lock force applied to the differential clutch mechanism and a differential slip speed from a disparity in the rotational speeds of the axle half-shafts; (ii) estimate an internal temperature of the differential clutch mechanism based, at least in part, on the differential lock force and the differential slip speed; (iii) detect differential overtemperature events during which the estimated internal temperature of the differential clutch mechanism exceeds at least a first critical temperature threshold stored in the computer-readable memory; and (iv) perform at least one predetermined differential overtemperature action in response to detection of a differential overtemperature event.

As utilized herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C"

indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As utilized herein, the singular forms "a", "an," and "the" are intentionally-grown to include the plural forms as well, unless the context clearly indicates otherwise. It will be further understood that the terms "comprises" and/or "comprising," when utilized in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A locking differential energy management system onboard a work vehicle having axle half-shafts, the locking differential energy management system comprising:
   axle speed sensors configured to monitor rotational speeds of the axle half-shafts;
   a locking differential through which the axle half-shafts are mechanically coupled, the locking differential containing a differential clutch mechanism controllable to selectively place the locking differential in a locked state;
   a computer-readable memory;
   a processing subsystem coupled to the axle speed sensors and to the computer-readable memory, the processing subsystem configured to:
      when the locking differential is placed in the locked state, calculate (i) a differential lock force applied to the differential clutch mechanism and (ii) a differential slip speed from a disparity in the rotational speeds of the axle half-shafts;
      estimate an internal temperature of the differential clutch mechanism based, at least in part, on the differential lock force and the differential slip speed;
      detect differential overtemperature events during which the internal temperature of the differential clutch mechanism exceeds at least a first critical temperature threshold stored in the computer-readable memory; and
      perform a predetermined differential overtemperature action in response to detection of a respective differential overtemperature event; and
   a temperature sensor coupled to the processing subsystem and configured to monitor a temperature of a coolant circulated through the differential clutch mechanism; and wherein the processing subsystem is configured to estimate the internal differential clutch temperature further based on the temperature of the coolant circulated through the differential clutch mechanism.

2. The locking differential energy management system of claim 1, wherein the locking differential is hydraulically actuated;
   wherein the locking differential energy management system further comprises a hydraulic pressure sensor configured to monitor a hydraulic actuation pressure supplied to the locking differential; and
   wherein the processing subsystem is coupled to the hydraulic pressure sensor and configured to determine the differential lock force as a function of the hydraulic actuation pressure supplied to the differential clutch mechanism.

3. The locking differential energy management system of claim 1, further comprising a hydraulic pump that, when active, drives circulation of coolant through the differential clutch mechanism;
   wherein the processing subsystem is configured to increase an output of the hydraulic pump to temporarily boost coolant flow through the differential clutch mechanism when detecting the differential overtemperature event.

4. The locking differential energy management system of claim 1, further comprising a display device associated with the work vehicle; and
   wherein, in response to detection of the differential overtemperature event, the processing subsystem is configured to generate a notification of the differential overtemperature event on the display device.

5. The locking differential energy management system of claim 4, wherein the processing subsystem is configured to:
   when detecting the differential overtemperature event, determine whether the internal differential clutch temperature further exceeds a second critical temperature threshold stored in the computer-readable memory, the second critical temperature threshold greater than the first critical temperature threshold;
   if determining that the internal differential clutch temperature exceeds the first critical temperature threshold and is less than the second critical temperature threshold, generate a low level notification of the differential overtemperature event on the display device; and
   if determining that the internal differential clutch temperature exceeds the second critical temperature threshold, generate a high level notification of the differential overtemperature event on the display device.

6. The locking differential energy management system of claim 1, further comprising a wireless network interface coupled to the processing subsystem;
   wherein, in response to detection of the differential overtemperature event, the processing subsystem is configured to utilize the wireless network interface to transmit data indicative the differential overtemperature event to a remote operations center over a communications network.

7. The locking differential energy management system of claim 1, wherein, in response to detection of the differential overtemperature event, the processing subsystem is configured to record data describing the differential overtemperature event into the computer-readable memory.

8. The locking differential energy management system of claim 1, wherein the processing subsystem is configured to increase, partially reduce, or temporarily cease application of the differential lock force applied to the differential clutch mechanism in response to detection of the differential overtemperature event.

9. The locking differential energy management system of claim 8, wherein the processing subsystem is configured to:
- when detecting the differential overtemperature event, determine a severity of the differential overtemperature event; and
- reduce the differential lock force in relation to the determined severity of the differential overtemperature event.

10. The locking differential energy management system of claim 8, wherein the processing subsystem is configured to:
- after partially reducing or removing the differential lock force, monitor whether the internal differential clutch temperature decreases below the first critical temperature threshold by a predetermined amount while the locking differential is still locked; and
- restore the differential lock force to a maximum value if the internal differential clutch temperature decreases below the first critical temperature threshold by the predetermined amount while the locking differential is still locked.

11. A locking differential energy management system onboard a work vehicle having axle half-shafts, the locking differential energy management system comprising:
- axle speed sensors configured to monitor rotational speeds of the axle half-shafts;
- a locking differential through which the axle half-shafts are mechanically coupled, the locking differential containing a differential clutch mechanism controllable to selectively place the locking differential in a locked state;
- a computer-readable memory;
- a processing subsystem coupled to the axle speed sensors and to the computer-readable memory, the processing subsystem configured to:
  - when the locking differential is placed in the locked state, calculate (i) a differential lock force applied to the differential clutch mechanism and (ii) a differential slip speed from a disparity in the rotational speeds of the axle half-shafts;
  - estimate an internal temperature of the differential clutch mechanism based, at least in part, on the differential lock force and the differential slip speed;
  - detect differential overtemperature events during which the internal temperature of the differential clutch mechanism exceeds at least a first critical temperature threshold stored in the computer-readable memory; and
  - perform a predetermined differential overtemperature action in response to detection of a respective differential overtemperature event;
- a temperature sensor coupled to the processing subsystem and configured to monitor a temperature of a coolant circulated through the differential clutch mechanism;
- wherein the processing subsystem is configured to estimate the internal differential clutch temperature further based on the temperature of the coolant circulated through the differential clutch mechanism; and
- wherein the processing subsystem is configured to estimate the internal differential clutch temperature further based on a flow rate of the coolant circulated through the differential clutch mechanism.

12. A method carried-out by a processing subsystem included in a locking differential energy management system onboard a work vehicle, the work vehicle having axle half-shafts coupled through a locking differential containing a differential clutch mechanism controllable to selectively place the locking differential in a locked state, the method comprising:
- when the locking differential is placed in the locked state, calculating (i) a differential lock force applied to the differential clutch mechanism and (ii) a differential slip speed from a disparity in rotational speeds of the axle half-shafts, as detected by axle speed sensors onboard the work vehicle and coupled to the processing subsystem;
- estimating an internal temperature of the differential clutch mechanism based, at least in part, on the differential lock force and the differential slip speed and a temperature of a coolant circulated through the differential clutch mechanism, as measured by a temperature sensor onboard the work vehicle and coupled to the processing subsystem;
- detecting differential overtemperature events during which the internal temperature of the differential clutch mechanism exceeds at least a first critical temperature threshold stored in a computer-readable memory accessible to the processing subsystem; and
- performing a predetermined differential overtemperature action in response to detection of a respective differential overtemperature event.

13. The method of claim 12, further comprising determining the differential lock force as a function of a hydraulic actuation pressure supplied to the differential clutch mechanism, as detected by a hydraulic pressure sensor onboard the work vehicle and coupled to the processing subsystem.

14. The method of claim 12, further comprising estimating the internal differential clutch temperature further based on a flow rate of the coolant circulated through the differential clutch mechanism.

15. The method of claim 12, further comprising boosting coolant flow through the differential clutch mechanism when detecting the differential overtemperature event by increasing an output of a hydraulic pump onboard the work vehicle and utilized to drive coolant circulation through the differential clutch mechanism.

16. The method of claim 12, further comprising causing, via the processing subsystem and in response to detection of the differential overtemperature event, generation of a notification of the differential overtemperature event on a display device associated with the work vehicle.

17. The method of claim 12, further comprising, via the processing subsystem and in response to detection of the differential overtemperature event, transmitting data indicative the differential overtemperature event to a remote operations center over a communications network.

18. The method of claim 12, further comprising, via the processing subsystem and in response to detection of the differential overtemperature event, recording data describing the differential overtemperature event into the computer-readable memory.

19. The method of claim 12, further comprising, via the processing subsystem and in response to detection of the differential overtemperature event, controlling actuation of the locking differential to increase, to partially reduce, or to temporarily cease application of the differential lock force.

* * * * *